(12) United States Patent
Chen et al.

(10) Patent No.: US 6,658,258 B1
(45) Date of Patent: Dec. 2, 2003

(54) METHOD AND APPARATUS FOR ESTIMATING THE LOCATION OF A MOBILE TERMINAL

(75) Inventors: Byron Hua Chen, Whippany, NJ (US); Robert Ellis Richton, Madison, NJ (US); Ibrahim Tekin, Summit, NJ (US); Giovanni Vannucci, Township of Middletown, Monmouth County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 174 days.

(21) Appl. No.: 09/676,869

(22) Filed: Sep. 29, 2000

(51) Int. Cl.⁷ .................................................. H04Q 7/20
(52) U.S. Cl. ................................ 455/456.1; 455/456.2; 455/456.3; 455/562.1; 342/458
(58) Field of Search .................................. 455/456, 457, 455/562, 575, 550, 456.1, 456.2, 456.3, 562.1, 456.5, 456.6; 342/457, 458, 463

(56) References Cited

U.S. PATENT DOCUMENTS

| 5,327,144 A | | 7/1994 | Stilp et al. .................. 342/387 |
| 5,390,339 A | * | 2/1995 | Bruckert et al. ............. 342/457 |
| 5,602,903 A | * | 2/1997 | LeBlanc et al. ............. 342/457 |
| 5,969,679 A | | 10/1999 | Bolliger et al. ............. 342/464 |
| 6,061,337 A | | 5/2000 | Light et al. .................. 370/331 |

(List continued on next page.)

FOREIGN PATENT DOCUMENTS

| EP | 1 014 103 A2 | 6/2000 | ............. G01S/5/10 |
| EP | 1 030 531 A1 | 8/2000 | ............. H04Q/7/28 |
| WO | W)99/37037 | 7/1999 | ............ H04B/1/707 |
| WO | WO 99/61934 | 12/1999 | ............. G01S/5/14 |

OTHER PUBLICATIONS

European Search Report dated May 11, 2001 of Chen 8–8–4–, Application No. 01303311.3–2209, The Hague.

(List continued on next page.)

*Primary Examiner*—Edward F. Urban
*Assistant Examiner*—Lana Le (57) ABSTRACT

A method and apparatus for estimating the location of a mobile terminal. The method estimates the locations by: a) using at least one forward-link geo-location technique without using any reverse-link geo-location techniques, this being performed when there are enough base stations visible to the mobile terminal to be able to use the forward-link geo-location technique without using any reverse-link geo-location techniques to estimate the location, and b) using at least one reverse-link geo-location technique when there are not enough base stations visible to the mobile terminal to be able to use the forward-link geo-location technique without also concurrently using any reverse-link geo-location techniques to estimate the location. The forward-link geo-location techniques can be used either alone or in combination with each other, and include such known geo-location techniques as a time-difference-of-arrival technique and angle-difference-of-arrival technique. Illustratively, when the predetermined number, for example three, base stations are visible to the mobile terminal, the location of the mobile terminal is estimated using time-difference-of-arrival. When fewer than three base stations are visible to the mobile terminal, the location of the mobile terminal is estimated using round trip delay. Estimating the location of a mobile terminal by using only forward-link geo-location techniques when there are enough base stations visible to the mobile terminals to be able to use forward-link geo-location techniques, produces a more accurate estimation of the mobile terminal's location. It also allows wireless assisted GPS (AGPS) systems to more quickly estimate a more precise location of the mobile terminal.

22 Claims, 3 Drawing Sheets

U.S. PATENT DOCUMENTS

| | | | |
|---|---|---|---|
| 6,114,991 A | | 9/2000 | Richton et al. ............. 342/357 |
| 6,157,842 A | * | 12/2000 | Karlsson et al. ......... 455/456.2 |
| 6,198,935 B1 | * | 3/2001 | Saha et al. ............... 455/456.2 |
| 6,275,186 B1 | * | 8/2001 | Kong ....................... 455/456.1 |
| 6,295,455 B1 | * | 9/2001 | Fischer et al. ........... 455/456.2 |
| 6,477,379 B2 | * | 11/2002 | Kingdon .................. 455/456.1 |
| 6,490,456 B1 | * | 12/2002 | Bogdan et al. ............. 342/463 |
| 6,522,887 B2 | * | 2/2003 | Larsson et al. .......... 455/456.5 |
| 6,539,229 B1 | * | 3/2003 | Ali ............................. 342/463 |

OTHER PUBLICATIONS

T.S. Rappaport, et al., Position Location Using Wireless Communications On Highways Of The Future, IEEE Communications Magazine, Oct., 1996, pp. 33–41.

U.S. patent application Ser. No. 09/251,500, Chen et al., filed Feb. 17, 1999.

* cited by examiner

METHOD AND APPARATUS FOR ESTIMATING THE LOCATION OF A MOBILE TERMINAL

BACKGROUND OF THE INVENTION

The present invention relates generally to wireless communication systems and, in particular, to methods used in wireless communication systems to locate a mobile terminal.

Estimating the location of a mobile terminal is becoming more and more important in wireless communication systems. For example, the location of a mobile terminal is used in applications such as emergency 911 and location-based billing. A number of geo-location techniques are known for estimating the location of a mobile terminal. A typical one of these geo-location techniques is to estimate and use a round-trip delay—the time it takes a signal to travel from a base station to the mobile terminal and back—to determine the distance of the mobile terminal from the base station. This distance and knowledge of which so-called sector of the cell of the wireless communication system the mobile terminal is located in are then used to determine the location of the mobile terminal. This typically allows the estimation of the location of the mobile terminal with an accuracy of between 200 meters (m) and 1500 m, depending on the size of the cell.

Other geo-location techniques can be used instead of, or in addition to, round trip delay to estimate the location of the mobile terminal. For example, U.S. Pat. No. 6,061,337, entitled "System and Method for CDMA Handoff Using Telemetry to Determine the Need for Handoff and to Select the Destination Cell Site", and U.S. Pat. No. 5,969,679, entitled "Method and Apparatus for Determining Whether a Wireless Station is Operating Within a Prescribed Geographic Region", both incorporated herein by this reference, describe geo-location techniques that can be used to estimate the location of the mobile terminal. The location of the mobile terminal can also be estimated using the well-known techniques of time-difference-of-arrival, angle-difference-of-arrival, and/or the angle-of-arrival. Some of these geo-location techniques can be used regardless of the number of base stations visible to the mobile terminal while others cannot be used unless a certain number of base stations are "visible" to the mobile terminal. A base station is said to be visible to the mobile terminal when its so-called pilot signal is adequately detectable by the mobile terminal. For example, time-difference-of-arrival and round trip delay can be used in combination to determine the location of the mobile terminal when at least two base stations are visible to the mobile terminal. However, to use time-difference-of-arrival alone to determine the location of the mobile terminal at least three base stations should be visible to the mobile terminal.

In some applications the degree of accuracy of the location of the mobile terminal estimated with the various geo-location techniques and/or combinations of same, as just described, is acceptable. In other applications, however, a still higher degree of accuracy is required. In such cases, the estimated location can be used as a parameter in other techniques, for example, wireless assisted GPS (AGPS), to estimate the location of the mobile terminal more precisely, i.e. to refine the estimated location of the mobile terminal. A more accurate estimation of the location of the mobile terminal provided by the geo-location techniques allows for a quicker estimation of the location of the mobile terminal by such techniques as AGPS.

Due to both ever-more-stringent government requirements and to the increased profitability of system operation resulting from improvement in the speed and accuracy of estimating the location of mobile terminals, such improvement is a continuing goal in the wireless communication industry. Thus, while the known geo-location techniques for estimating the location of the mobile terminal are good enough to fill most present requirements, they may not fill proposed government requirements and/or industry desires going forward. Therefore, there is still a need to estimate the location of the mobile terminal more accurately.

SUMMARY OF THE INVENTION

The present inventors have realized that further improvement in estimating the location of a mobile terminal is possible. Some geo-location techniques, referred to herein as forward-link geo-location techniques, use only information obtained from one or more forward-link signals—the signals that are transmitted from the base station to the mobile terminal. Other geo-location techniques, referred to herein as reverse-link geo-location techniques, use information obtained from reverse-link signals—the signals that are transmitted from the mobile terminal to the base station—either alone or in combination with information obtained from the forward-link signals. The present invention takes advantage of the present inventors' recognition that when there are enough base stations visible to the mobile terminal to be able to use the forward-link geo-location techniques, then the reverse-link signals are typically weak. As a result, when there are enough base stations visible to the mobile terminal to be able to use the forward-link geo-location techniques, the reverse-link geo-location techniques may produce results that are less accurate than the results produced by the forward-link geo-location techniques. Thus, even a technique that combines the results of the forward-link and reverse-link geo-location techniques may produce results that are less accurate then the results produced by the forward-link geo-location techniques alone.

In accordance with the present invention, then, the estimation of the location of a mobile terminal is improved by: a) using at least one forward-link geo-location technique without using any reverse-link geo-location techniques, this being performed when there are enough base stations visible to the mobile terminal to be able to use the forward-link geo-location technique without using any reverse-link geo-location techniques to estimate the location, and b) using at least one reverse-link geo-location technique when there are not enough base stations visible to the mobile terminal to be able to use the forward-link geo-location technique without also concurrently using any reverse-link geo-location techniques to estimate the location.

The forward-link geo-location techniques can be used either alone or in combination with each other, and include such known geo-location techniques as a time-difference-of-arrival technique and angle-difference-of-arrival technique.

In an illustrative embodiment of the invention, when the predetermined number, for example three, base stations are visible to the mobile terminal, the location of the mobile terminal is estimated using time-difference-of-arrival. When fewer than three base stations are visible to the mobile terminal, the location of the mobile terminal is estimated using round trip delay.

Estimating the location of a mobile terminal by using only forward-link geo-location techniques when there are enough base stations visible to the mobile terminals to be able to use forward-link geo-location techniques, produces a more accurate estimation of the mobile terminal's location. It also allows wireless assisted GPS (AGPS) systems to more quickly estimate a more precise location of the mobile terminal.

DETAILED DESCRIPTION

Figure 1:
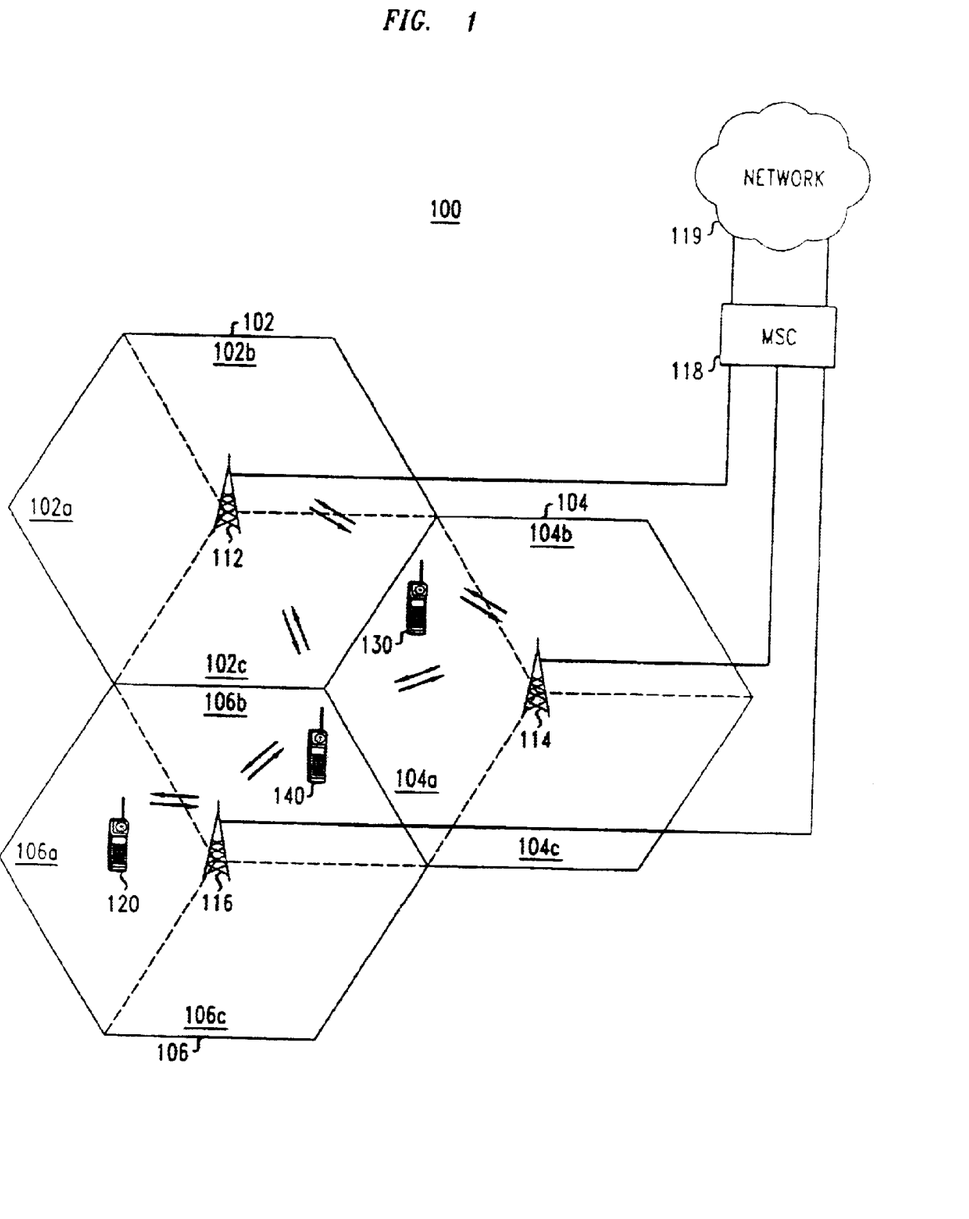
FIG. 1 is a diagram of a portion of a wireless communication system.

As shown in FIG. 1, the geographic area serviced by a wireless communications system 100 is divided into a plurality of spatially distinct areas called "cells." For ease of analysis each cell 102, 104, and 106 is typically approximated and schematically represented by a hexagon in a honeycomb pattern. However, each cell is actually of an irregular shape that depends on the topography of the terrain surrounding the cell. Each cell 102, 104, 106 can be divided into a plurality of sectors, such as three 120 sectors. Cell 102 is divided into sectors 102a, 102b, and 102c; cell 104 is divided into sectors 104a, 104b, and 104c; and cell 106 is divided into sectors 106a, and 106b and 106c. Each cell 102, 104, 106 contains one base station 112, 114, 116, respectively, each of which includes equipment to communicate with Mobile Switching Center ("MSC") 118. MSC 118 is connected to local and/or long-distance transmission network 119, such as a public switched telephone network (PSTN). Each base station 112, 114, 116 also includes transmitters and antennas. Typically, each base station includes different transmitters and antennas for each sector that the base station serves. The base stations use the transmitters and antennas to communicate over an air interface with mobile terminals, such as mobile terminals 120, 130, and 140.

Estimating the location of the mobile terminal is becoming more and more important in wireless communication systems. Position determination entity (PDE) 150 determines the location of mobile terminals. Typically, the PDE is a processor that uses the information provided by the base stations and/or the mobile terminals, as described below, to determine the location of the mobile terminal. PDE 150 receives this information from MSC 118 to which PDE 150 is connected. PDE 150 can be co-located with the MSC or with any of the base stations, and can share processing capacity with the MSC, or some other part of the wireless communication system. When PDE 150 is used in a wireless communication system that uses AGPS, PDE 150 can also include GPS receiver 160.

PDE 150 can use any of a number of geo-location techniques that are known for estimating the location of a mobile terminal. A typical one of these geo-location techniques is to estimate and use a round-trip delay—the time it takes a signal to travel from base station 116 to mobile terminal 120 and back—to determine the one way delay—the time it takes to travel between the mobile terminal and the base station. One way delay is calculated by subtracting the transmitting and receiving time delays from the round trip delay and dividing the result by two. The transmitting and receiving time delays can be determined by calibrating the base station. The one way delay is multiplied by the speed of light to produce the distance of mobile terminal 120 from base station 116. This distance and the knowledge that mobile terminal is located in sector 106a are then used to determine the location of mobile terminal 120. This typically allows the estimation of the location of mobile terminal 120 with an accuracy of between 200 m and 1500 m, depending on the size of cell 106.

Other geo-location techniques can be used instead of, or in addition to, round trip delay to estimate the location of the mobile terminal. For example, the location of mobile terminal 140 can be estimated using such techniques known in the art as time-difference-of-arrival, angle-difference-of-arrival, or angle-of-arrival. Some of these geo-location techniques can be used regardless of the number of base stations visible to the mobile terminal while others cannot be used unless a certain number of base stations are visible to the mobile terminal. A base station is said to be "visible" to the mobile terminal (i.e. a mobile terminal can "see" a base station) when signal transmitted by the base station are detectable by the mobile terminal. For example, a base station is visible to the mobile terminal when a pilot signal-a direct-sequence spread spectrum signal transmitted continuously by each base station-is detectable by the mobile terminal. This means that the mobile terminal receives the signals with at least a threshold degree of signal quality, e.g. the signals' strength is adequately higher than that of noise. For example, the pilot signal's signal strength, as received by the mobile terminal, may be considered to be adequately higher than that of noise when its signal strength is any value between −12 dB to −18 dB. Typically, once this criterion has been met, the base station is added to the mobile terminal's candidate set—a set of base stations that may be candidates for communication with the mobile terminals. The base station is moved from the candidate set into the mobile terminal's active set—a set of base stations with which the mobile terminal is communicating—when the pilot signal is definitely detectable. Thus, in one illustrative embodiment of the invention, the presence of a particular base station in the mobile terminal's candidate set or active set at any particular point in time serves as a convenient way for the PDE to know that this base station's pilot signal is being received with at least the threshold degree of signal quality. However, in some systems the base station may be in the mobile terminal's candidate set and yet the mobile terminal may not be receiving this base station's pilot signal with the threshold degree of signal quality. In these systems, it is the presence of the base station in the mobile terminal's active set that serves as a way for the PDE to know that this base station's pilot signal is being received with the threshold degree of signal quality.

For example, mobile terminal 120 can see only one base station, 116; mobile terminal 130 can see two base stations, 112 and 114; and mobile terminal 140 can see three base stations, 112, 114, and 116.

The location of the mobile terminal can also be estimated using a weighted average of geo-location techniques, such as the ones mentioned above. See, for example, U.S. patent application, Ser. No., 09/251,500, entitled "Method for Combing Multiple Measurements to Determined the Position of a Mobile Transceiver", incorporated herein by this reference. In this technique, the mobile terminal's location is estimated using several geo-location techniques alone or in combination. The results of these techniques are then averaged, or weighted and averaged, to estimate the location of the mobile terminal. For example, base station 116 provides PDE 150 with the information available when a mobile terminal only sees one base station. The base station provides PDE 150 with the round trip delay and the information contained in the pilot strength measurement message transmitted by the mobile terminal to the base station. The pilot strength measurement message contains information on the sector in which the base station is located, the time stamp, the pilot PN numbers, and the pilot strength, from which the angle-of-arrival can be estimated. (The pilot strength measurement message also contains the pilot phases, from which time-difference of arrival and angle-of arrival could be calculated if more base stations were visible.) Thus, PDE 150 can estimate the location of mobile terminal 120 using a combination of round trip delay and angle-of-arrival.

Further in accordance with the technique disclosed in the '500 patent application, base stations 112 and 114 and mobile terminal 130 provide PDE 150 with the information available when a mobile terminal sees two base stations. Thus, PDE 150 can estimate the location of mobile terminal 130 by weighting and averaging the results of: 1) the combination of round trip delay and angle-of-arrival, and 2) the combination of round trip delay and time-difference-of-arrival. Base stations 112, 114, and 116 and mobile terminal 140 provide PDE 150 with the information available when a mobile terminal sees three base stations. Thus, PDE 150 can estimate the location of mobile terminal 140 by weighting and averaging the results of: 1) the combination of round trip delay and angle-of-arrival, 2) the combination of round trip delay and time-difference-of-arrival, and 3) time-difference-of-arrival. Using a weighted average of several geo-location techniques may allow the estimation of the location of the mobile terminal with an accuracy of typically between 200 m and 300 m.

In some applications the degree of accuracy of the location of the mobile terminal estimated with the various geo-location techniques and/or combinations of same, as just described, is acceptable. In other applications, however, a still higher degree of accuracy is required. In such cases, the estimated location can be used as a parameter in other techniques, for example, wireless assisted GPS (AGPS), to estimate the location of the mobile terminal more precisely, i.e. to refine the estimated location of the mobile terminal.

The manner in which AGPS is used to estimate the location of the mobile terminal is now described in more detail to show how a more accurate estimation of the location of the mobile terminal by the geo-location techniques results in a quicker estimation of the location by AGPS.

In wireless communications systems that use AGPS, PDE 150 includes GPS receiver 160. GPS receiver 160 receives GPS signals, each transmitted by one of the GPS satellites. The start of one cycle of the GPS signal is referred to herein as the first chip of the GPS signal, where a chip is a time period that corresponds to one bit time of the spreading code used to spectrally spread the GPS signal.

GPS receiver 160 determines at what local GPS time the first chip of one of the cycles of a GPS signal is received from a particular satellite, where GPS time is a time to which all GPS satellites are synchronized and to which GPS receivers try to synchronize. Typically, though, the GPS receivers are not able to synchronize to GPS time perfectly, and there is an offset, i.e. time difference, between GPS time and the GPS time at the receiver, referred to herein as the local GPS time.

The local GPS time at which the first chip is received is based on the time at which the GPS satellite transmitted the signal and the time it took for the signal to travel to GPS receiver 160. Since the time period of the cycles and the speed and trajectory of the satellites are known, the GPS receiver can set up a search window, typically of a certain number of chips, in which to look for the first chip of the GPS signal. This window is often referred to as the code phase search window.

It takes a significant amount of processor power to determine the local GPS time at which the first chip is received. Performing this determination centrally, for example, in the GPS receiver of PDE 150, using the processor located in the PDE, and then providing the resulting search window to the mobile terminals allows the mobile terminals to use much smaller processors and still be able to fairly quickly determine when the first chip of a GPS signal is due to arrive at the mobile terminals. The mobile terminal then uses the search window to determine when the first chips of the various GPS signals arrive at the mobile terminal, which it then uses to determine GPS obtained location information. The GPS obtained location information is used by the mobile terminal or by the PDE (or another part of the wireless communication system) to estimate the mobile terminal's location. (Note that the above description addresses only the detection of the GPS signal in the time domain, assuming the Doppler shift and frequency are known.)

However, there are several factors that make the search window at GPS receiver 160 of the PDE not as accurate at the mobile terminals as it is at GPS receiver 160. The search window should be adjusted to accommodate for two of the important factors before the mobile terminal uses the search window. The first of these factors is that the mobile terminal is not located at the same location as GPS receiver 160. Therefore, the travel time of the GPS signal to the mobile terminal will be different than the travel time to the GPS receiver 160, which will change the time at which the first chip of the GPS signal arrives at the mobile terminal. The PDE can use the location of the mobile terminal and the GPS receiver to adjust the search window to accommodate for the fact the mobile terminal and the GPS receiver are at different locations.

The second of the factors that should be adjusted for is the fact that the search window is calculated using local GPS time, referenced to GPS receiver 160, and the mobile terminal's clock may be offset from this local GPS time. This is explained with reference to mobile terminal 120. Mobile terminal 120 is synchronized to GPS time by synchronizing its clock with clock of base station 116, which is set to the local GPS time of GPS receiver 160. Mobile terminal 120 synchronizes with the clock of base station 116 by synchronizing to the first chip of base station 116's pilot signal. However, by the time the first chip of base stations 116's pilot signal arrives at mobile terminal 120 a one way delay, i.e. the time for it to travel the distance between base station 116 and mobile terminal 120, has elapsed. Therefore, the clock of mobile terminal 120 is offset from the local GPS time at GPS receiver 160 by the one way delay between mobile terminal 120 and base station 116. PDE 150 can easily calculate the one way delay from the location of the mobile terminal, if PDE 150 has not already calculated the one way delay when it was calculating the location of the mobile terminal. (For example, if round trip delay was used to initially estimate the location of the mobile terminal PDE 150 already has the one way delay.) The PDE can use the one way delay to adjust the center of the search window to accommodate for the fact the mobile terminal's clock is offset from the local GPS time at GPS receiver 160.

Therefore, a more accurate estimation of the location of the mobile terminal provided by the geo-location techniques and the resulting more accurate estimation of the one way delay allows for more accurate estimation of the search window. A more accurate estimation of the search window allows for a quicker estimation of the location of the mobile terminal by AGPS.

U.S. Pat. No. 6,114,991, entitled "Auxiliary System For Assisting A Wireless Terminal In Determining Its Position From Signals Transmitted From A Navigation Satellite", incorporated herein by this reference, discloses in more detail the operation of an AGPS system.

Due to both ever-more-stringent government requirements and to the increased profitability of system operation resulting from improvement in the speed and accuracy of estimating the location of mobile terminals, such improvement is a continuing goal in the wireless communication industry. Thus, while the known geo-location techniques for estimating the location of a mobile terminal are good enough to fill most present requirements, they may not fill proposed government requirements and/or industry desires going forward. For example, most known geo-location techniques may not fill the currently proposed government requirement that by Oct. 1, 2001, wireless service providers be able to locate a 911 caller with an accuracy of 50 meters 67% of the time, and 150 meters 95% of the time for so-called handset based solutions such as AGPS and 100 meters 67% of the time and 300 meters 95% of the time. Even when the estimated location can be used as an element of other techniques, such as AGPS, the imprecision of this initial estimated location may require a significant amount of time for AGPS to estimate the location of the mobile terminal more precisely. Thus, there is still a need to estimate the location of the mobile terminal more accurately.

The present inventors have realized that further improvement in estimating the location of a mobile terminal is possible. Some geo-location techniques, referred to herein as forward-link geo-location techniques, use information obtained only from the forward-link signals—the signals that are transmitted from the base station to the mobile terminal. Other geo-location techniques, referred to herein as reverse-link geo-location techniques, use information obtained from the reverse-link signals—the signals that are transmitted from the mobile terminal to the base station— either alone or in combination with information obtained from the forward-link signals. The present invention takes advantage of the present inventors' recognition that when there are enough base stations visible to the mobile terminal to be able to use the geo-location techniques that use the information obtained from the forward-link signals, then the reverse-link signals are typically weak.

This phenomenon is explained in more detail with reference to FIG. 1. When a call is set up in wireless communication system 100, a mobile terminal communicates with the base station from which it receives the strongest pilot signal. When a mobile terminal is close to a base station, such as mobile terminal 120 to base station 116, mobile terminal 120 receives a fairly strong pilot signal from base station 116 and very weak, if any, pilot signals from any other base stations, thus, seeing only base station 116. When only one base station is visible to the mobile terminal only reverse-link geo-location techniques can be used to determine the location of the mobile terminal.

As the mobile terminal moves further from the base station, such as mobile terminal 140, it is now able to detect pilot signals from three base stations, 112, 114, and 116, so mobile terminal 140 sees three base stations. Typically, forward-link geo-location techniques can be used, without any additional information provided by reverse-link geo-location system, to determine the location of the mobile terminal when at least three base stations are visible to the mobile terminal.

When mobile terminal 140 is far from any base station it has to send the signals to the base stations at a significantly higher power level for the signal to arrive at the base station at an acceptable level of signal performance. Typically, the wireless communication system directs the power amplifier in the mobile terminal to maintain a fairly low power output in order to reduce the interference and/or noise to other mobile terminals. Therefore, the power amplifier may only provide enough power for the mobile terminal to transmit signals to the base stations so that they are received at the base station at, or just below the lower levels of acceptable signal performance, meaning that the reverse-link signal is weak. This is even more of a problem when there is a significant amount of interference and/or noise and mobile terminal 140 needs to increase the power of the reverse-link signal to compensate for both 1) the distance from the base stations and 2) the interference and/or noise.

As the signal quality on the reverse-link decreases, i.e. the reverse-link becomes weaker, there are more errors in the signal on the reverse-link and it becomes more difficult for the base station to accurately estimate the approximate location.

Typically, the power amplifier in the base station can provide significantly more power then the power amplifier in the mobile terminal. Furthermore, in CDMA wireless communication systems the forward-link signals are designed to be orthogonal to one another. Therefore, when the mobile terminal is far from the base station the strength of the forward-link signals is typically larger than the strength of the reverse-link signals.

As a result of the just described phenomenon, when there are enough base stations visible to the mobile terminal to be able to use the forward-link geo-location techniques, the reverse-link geo-location techniques may produce results that are less accurate than the results produced by the forward-link geo-location techniques. Thus, even averaging the results of the forward-link and reverse-link geo-location techniques may produce results that are less accurate than the results produced by the forward-link geo-location techniques alone.

Estimating the location of a mobile terminal by using only forward-link geo-location techniques when there are enough base stations visible to the mobile terminal produces a more accurate estimation of the mobile terminal's location. It also allows AGPS systems to more quickly estimate a more precise location of the mobile terminal.

In accordance with the present invention, then, the estimation of the location of a mobile terminal is improved by: a) using at least one forward-link geo-location technique without using any reverse-link geo-location techniques, this step being performed when there are enough base stations visible to the mobile terminal to be able to use the forward-link geo-location technique without using any reverse-link geo-location techniques to estimate the location, and b) using at least one reverse-link geo-location technique when there are not enough base stations visible to the mobile terminal to be able to use the forward-link geo-location technique without also concurrently using any reverse-link geo-location techniques to estimate the location.

Figure 2:
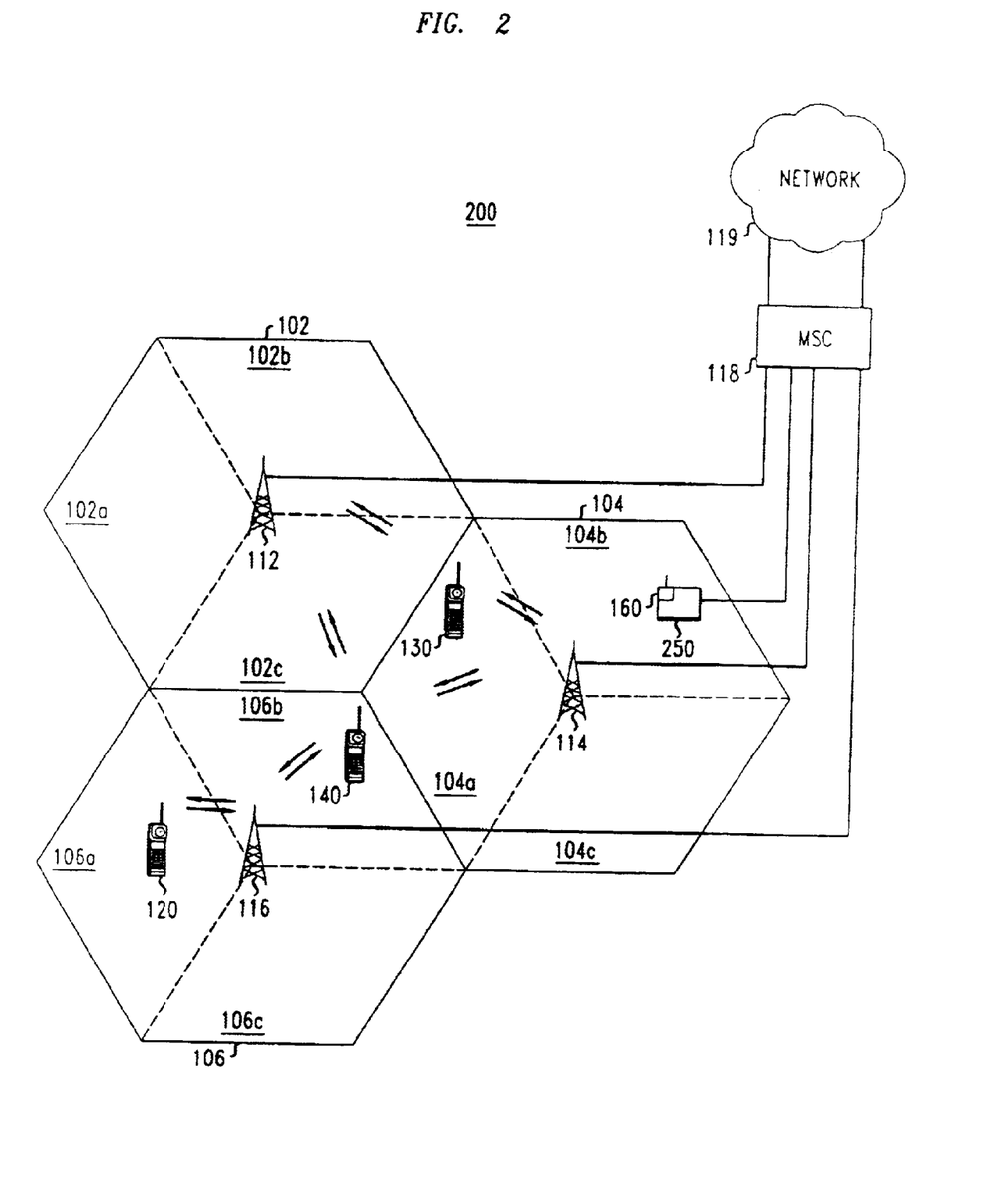
FIG. 2 is a diagram of a portion of a wireless communication system according to an embodiment of the present invention.
Figure 3:
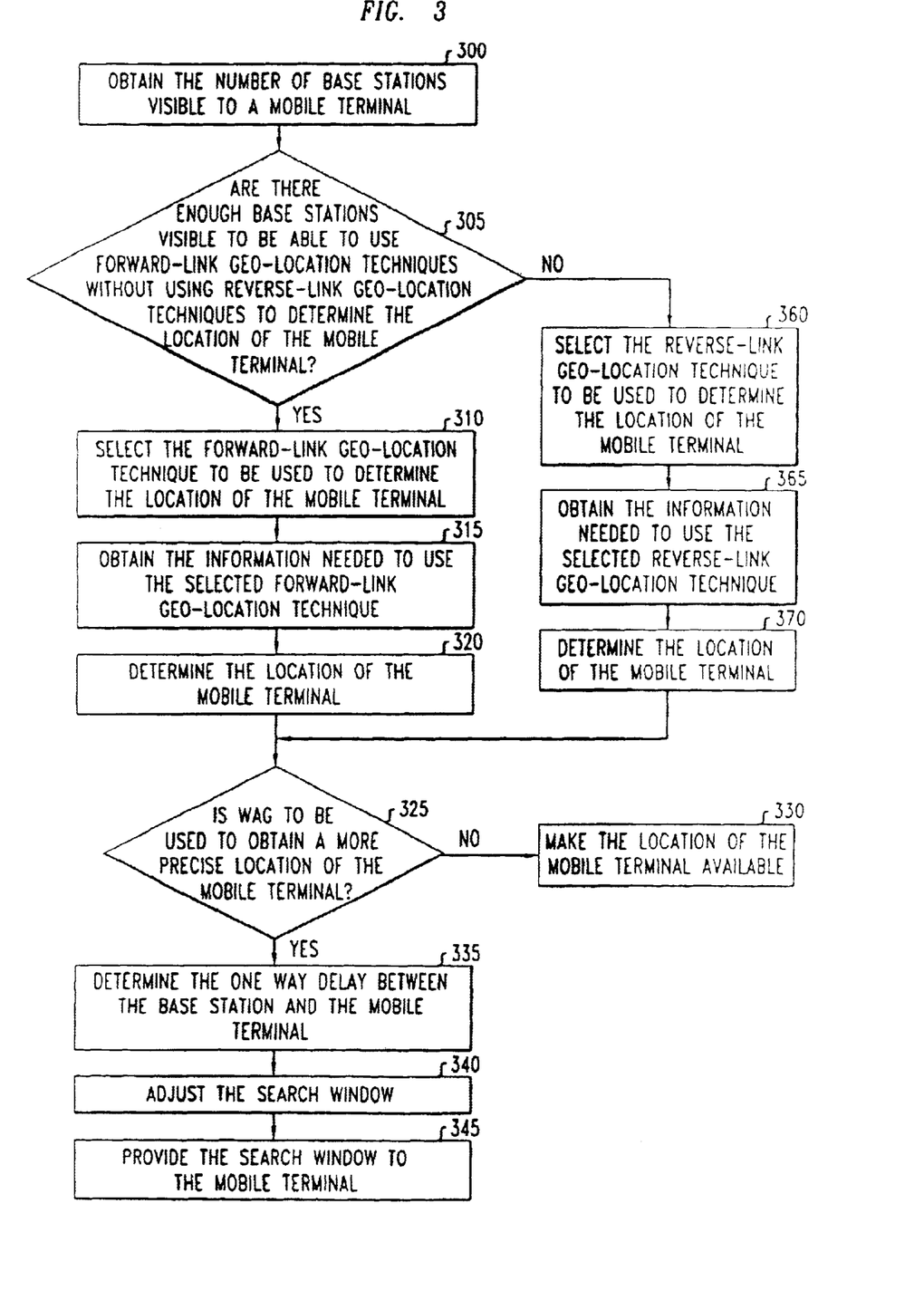
FIG. 3 is a flowchart of the operation of the wireless communication system of FIG. 2.

FIG. 2 shows wireless communication system 200. Wireless communication system 200 is essentially the same as wireless communication system 100, except instead of PDE 150 wireless communication system 200 includes PDE 250 that embodies the principles of the present invention. FIG. 3 illustrates the flow of the process of operation of wireless communication system 200 according to an illustrative embodiment of the invention. As indicated at step 300, PDE 250 obtains the number of base stations visible to a mobile terminal, for example by receiving this information from the mobile terminal. In step 305, the PDE then checks whether there are enough base stations visible to the mobile terminal to be able to use the forward-link geo-location techniques without using any reverse-link geo-location techniques to determine the location of the mobile terminal. If the answer in step 305 is YES, such as for example for mobile terminal 140, then PDE selects the forward-link geo-location technique, or combination of forward-link geo-location techniques, to be used to determine the location of mobile terminal 140, step 310, for example time-difference-of-arrival. The PDE then obtains from mobile terminal 140 the information needed to use time-difference-of-arrival to determine its location, step 315, and uses time-difference-of-arrival to determine the location of mobile terminal 140, step 320.

The PDE then checks, in step 325, if AGPS is to be used to obtain a more precise location of the mobile terminal. This decision can be based on any of a number of considerations, including the time frame to estimate the location and the desired accuracy of the estimation. If AGPS is not to be used, the answer in step 325 is NO, then is step 330 PDE 250 makes the location of the mobile terminal available to the services of the wireless communication system that would use it, such as, for example, the emergency 911 applications, or location based billing.

If AGPS is to be used, the answer in step 325 is YES, then is step 335 the PDE uses the location of the mobile terminal to determine the one way delay between the base station and the mobile terminal. As described above, the PDE uses the location of the mobile terminal and the one way delay to adjust the search window, step 340, and provides the search window to the mobile terminal, step 345. The mobile terminal then uses the search window to determine when the first chips of the various GPS signals arrive at the mobile terminal, which it then uses to determine its location.

It will be recalled that the sequence of steps just described is carried out when the determination of whether there are enough base stations visible to the mobile terminal to be able to use only forward-link geo-location techniques to determine the location of the mobile terminal, at step 305, resulted in an answer of YES. If on the other hand this determination resulted in an answer of NO, such as for example for mobile terminals 120 and 130, the process then proceeds to step 360. (For ease of reference steps 360 through 370 are first described for mobile terminal 120 and then for mobile terminal 130.) At step 360 the PDE selects a geo-location technique, or combination of geo-location techniques, at least one of which is a reverse-link geo-location technique. For example the PDE can select a combination of round trip delay and angle-of-arrival. The PDE then obtains, from base station 116, the information to use round trip delay and angle-of-arrival to determine the location of mobile terminal 120, step 365, and uses round trip delay and angle-of-arrival to determine the location of mobile terminal 120, step 370.

Similarly, for mobile terminal 130 the PDE selects a geo-location technique, or combination thereof, at least one of which is a reverse-link geo-location technique to be used to determine the location of mobile terminals 130, step 360. For example, the PDE can select a combination of round trip delay and time-difference-of-arrival, where the time-difference-of-arrival is the time difference of arrival at mobile terminal 130 of signals from just two base stations, 112 and 114. The PDE then obtains, from base stations 112 and 114 and from mobile terminal 130, the information to use round trip delay and time-difference-of-arrival to determine the location of mobile terminal 130, step 365. The PDE then uses round trip delay and time-difference-of-arrival to determine the location of mobile terminal 130, step 370.

The process then returns to step 325 and proceeds as described above.

The foregoing is merely illustrative. Thus, for example, in the illustrative embodiment only forward-link geo-location techniques are used to determine the location of a mobile terminal when the mobile terminal is able to see at least three base stations. Other forward-link geo-location techniques may be developed in the future. If there are forward-link geo-location techniques that can be used, without any information from reverse-link geo-location techniques, when there are fewer than three base stations visible, then, in alternative embodiments only forward-link geo-location techniques are used when the mobile terminal is able to see that fewer number of base stations.

Additionally, although in the illustrative embodiment of the invention one freestanding PDE is shown as servicing a particular geographic area, in alternative embodiments of the invention there can be any number of PDEs servicing a particular geographic area. For example, the MSC can be connected to several PDEs, or the MSC can share a PDE with one or several other MSCs. Furthermore, the PDEs can be anywhere in the wireless communication system. For example the PDEs can be free-standing as shown in FIG. 2, co-located with any of the apparatus of MSC, or co-located with the base stations. The number of PDEs servicing a particular geographic area depends on the type of location services available in the wireless communication system and the number of customers who utilize these services.

Moreover, although in the illustrative embodiment of the invention the PDE includes a GPS receiver, in alternative embodiments of the invention the PDE can receive the GPS, or similar, information from a satellite reference service. The satellite reference service is a service that, for example, includes strategically placed GPS receivers that gather the GPS information that is would be required by the PDE.

Furthermore, the wireless communication system can be any wireless communications system, such as a CDMA.

While the invention has been described with reference to a preferred embodiment, it will be understood by those skilled in the art having reference to the specification and drawings that various modifications and alternatives are possible therein without departing from the spirit and scope of the invention.

We claim:
1. A method comprising the steps of:
   estimating the location of a mobile terminal using at least one forward-link geo-location technique without using any reverse-link geo-location techniques, this step being performed when there are enough base stations visible to the mobile terminal to be able to use the forward-link geo-location technique without using any reverse-link geo-location techniques to estimate the location; and
   estimating the location of the mobile terminal using at least one reverse-link geo-location technique when there are not enough base stations visible to the mobile terminal to be able to use the forward-link geo-location technique without using any reverse-link geo-location techniques to estimate the location;

a forward-link geo-location technique being a geo-location technique that uses only information obtained from one or more forward-link signals to estimate the location of the mobile terminal; and a reverse-link geo-location technique being a geo-location technique that uses information obtained from at least one reverse-link signal to estimate the location of the mobile terminal.

2. The method of claim 1, further comprising the step of determining whether there are said enough base stations, the determining step being performed prior to the estimating steps.

3. The method of claim 1, wherein a base station is visible to the mobile terminal when signals transmitted by that base station are received at the mobile terminal with at least a threshold degree of signal quality.

4. The method of claim 1, wherein a base stations is visible to the mobile terminal when that base station's pilot signal is received at the mobile terminal with at least a threshold degree of signal quality.

5. The method of claim 1, wherein the reverse-link geo-location technique uses information obtained from at least one forward-link signal in addition to the information obtained from the at least one reverse-link signal to estimate the location of the mobile terminal.

6. The method of claim 1, wherein the mobile terminal is located in a wireless communication system.

7. The method of claim 1, wherein the forward-link geo-location technique comprises a time difference of arrival technique.

8. The method of claim 1, wherein the forward-link geo-location technique comprises an angle difference of arrival technique.

9. The method of claim 1, wherein the reverse-link geo-location technique comprises round trip delay.

10. The method of claim 1, further comprising the step of refining the estimated location of the mobile terminal using assisted GPS.

11. The method of claim 1, further comprising the step of refining the estimated location of the mobile terminal using assisted GPS responsive to receiving the estimated location of the mobile terminal and to receiving GPS obtained location information from the mobile terminal.

12. A method comprising the steps of:

estimating the location of a mobile terminal using at least one forward-link geo-location technique without using any reverse-link geo-location techniques when there are at least a predetermined number of base stations visible to the mobile terminal; and estimating the location of the mobile terminal using at least one reverse-link geo-location technique when there are fewer than the predetermined number of base stations visible to the mobile terminal;

a forward-link geo-location technique being a geo-location technique that uses only information obtained from one or more forward-link signals to estimate the location of the mobile terminal; and the reverse-link geo-location technique being a geo-location technique that uses information obtained from at least one reverse-link signal to estimate the location of the mobile terminal.

13. The method of claim 12, wherein the predetermined number is three.

14. The method of claim 12, wherein a base station is visible to the mobile terminal when signals transmitted by that base station are received at the mobile terminal with at least a threshold degree of signal quality.

15. The method of claim 12, wherein a base stations is visible to the mobile terminal when that base station's pilot signal is received at the mobile terminal with at least a threshold degree of signal quality.

16. The method of claim 12, wherein the reverse-link geo-location technique uses information obtained from at least one forward-link signal in addition to the information obtained from the at least one reverse-link signal to estimate the location of the mobile terminal.

17. The method of claim 12, wherein the mobile terminal is located in a wireless communication system.

18. The method of claim 12, wherein the forward-link geo-location technique comprises a time difference of arrival technique.

19. The method of claim 12, wherein the forward-link geo-location technique comprises an angle difference of arrival technique.

20. The method of claim 12, wherein the reverse-link geo-location technique comprises round trip delay.

21. The method of claim 12, further comprising the step of refining the estimated location of the mobile terminal using assisted GPS.

22. The method of claim 12, further comprising the step of refining the estimated location of the mobile terminal using assisted GPS responsive to receiving the estimated location of the mobile terminal and to receiving GPS obtained location information from the mobile terminal.

* * * * *